(12) United States Patent
Simek et al.

(10) Patent No.: US 10,715,494 B2
(45) Date of Patent: Jul. 14, 2020

(54) ORCHESTRATING WORK ACROSS DOMAINS AND WORK STREAMS

(71) Applicant: Microsoft Technology Licensing, LLC, Redmond, WA (US)

(72) Inventors: Patrick J. Simek, Redmond, WA (US); Prashant Gaurav, Sammamish, WA (US); Kalyan K. Kona, Sammamish, WA (US); Ilker Celikyilmaz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 15/595,720

(22) Filed: May 15, 2017

(65) Prior Publication Data
US 2018/0332108 A1 Nov. 15, 2018

(51) Int. Cl.
*H04L 29/06* (2006.01)
*G06F 15/76* (2006.01)
(Continued)

(52) U.S. Cl.
CPC .......... *H04L 63/0272* (2013.01); *G06F 15/76* (2013.01); *H04L 63/0442* (2013.01);
(Continued)

(58) Field of Classification Search
CPC ............. H04L 67/1014; H04L 63/0272; H04L 63/0846; H04L 63/164; H04L 63/205;
(Continued)

(56) References Cited

U.S. PATENT DOCUMENTS

| 8,132,177 B2 | 3/2012 | Halasz et al. |
| 8,171,385 B1 | 5/2012 | Tormasov |

(Continued)

FOREIGN PATENT DOCUMENTS

WO    2013037619 A1    3/2013

OTHER PUBLICATIONS

Li, et al., "Dynamic Overload Balancing in Server Farms", In Proceedings of IEEE IFIP Networking Conference, Jun. 2, 2014, pp. 1-9.

(Continued)

*Primary Examiner* — Shewaye Gelagay
*Assistant Examiner* — Carlton Johnson
(74) *Attorney, Agent, or Firm* — Newport IP, LLC; Scott Y. Shigeta

(57) ABSTRACT

Aspects of the present disclosure provide systems and methods for directly transferring tenant data hosted on a source domain to a target domain, wherein the source and target domains are associated with different server farms. Additionally, where the source domain is managed by a source management layer and the target domain is managed by target management layer, which source and target management layers are not in a trust relationship. Aspects describe establishing a secure, direct communication bus between the source and target management layers in order to accomplish a plurality of steps involved in transferring the tenant, wherein tenant data transferred thereon is encrypted. In example aspects, the direct communication bus terminates upon completion of the tenant data transfer.

20 Claims, 12 Drawing Sheets

(51) Int. Cl.
*G06F 15/16* (2006.01)
*H04L 29/08* (2006.01)
(52) U.S. Cl.
CPC ............ *H04L 63/062* (2013.01); *G06F 15/16* (2013.01); *H04L 63/108* (2013.01); *H04L 63/168* (2013.01); *H04L 67/141* (2013.01); *H04L 67/143* (2013.01); *H04L 69/22* (2013.01)
(58) Field of Classification Search
CPC . H04L 67/1008; H04L 63/0442; G06F 15/76; G06F 15/16
See application file for complete search history.

(56) References Cited

U.S. PATENT DOCUMENTS

| | | | |
|---|---|---|---|
| 8,244,559 B2 * | 8/2012 | Horvitz | G06F 9/5027 705/4 |
| 8,676,983 B2 | 3/2014 | Ganapathi et al. | |
| 8,762,323 B2 | 6/2014 | Moon et al. | |
| 9,009,313 B2 * | 4/2015 | Rice | G06Q 30/0601 709/225 |
| 9,081,624 B2 | 7/2015 | Liu et al. | |
| 2014/0019753 A1 * | 1/2014 | Lowry | H04L 63/062 713/155 |
| 2014/0223013 A1 * | 8/2014 | Gaglianello | H04L 61/2084 709/226 |
| 2016/0019098 A1 | 1/2016 | Cahill et al. | |

OTHER PUBLICATIONS

"SharePoint 2010 Multi-Tenant: Move Tenant from one farm to another", https://social.technet.microsoft.com/Forums/en-US/c4086cd6-3622-44f4-8801-dd01408c30ad/sharepoint-2010-multitenant-move-tenant-from-one-farm-to-another?forum=sharepointadminprevious, Published on: Feb. 1, 2016, 4 pages.

"Plan for secure communication within a server farm", https://technet.microsoft.com/en-in/library/cc263077(v=office.12).aspx, Published on: Apr. 23, 2009, 4 pages.

* cited by examiner

ORCHESTRATING WORK ACROSS DOMAINS AND WORK STREAMS

BACKGROUND

Large data centers may host data for a number of tenants across a number of server farms or domains. In aspects, a management layer may coordinate, monitor and balance resources for each domain. In some cases, to better service tenants, data may need to be moved or redistributed in response to a changing resource environment within a domain (e.g., the data of one tenant is growing more quickly vis-à-vis other tenants hosted within the same resource domain). As should be appreciated, the data and content maintained for one tenant must be isolated from the data and content maintained for another tenant within a hosting environment. However, in order to balance resources, data may need to be moved between domains that are not in a trust relationship. Today, to prevent any sharing of data between tenants, moving data for a tenant hosted on a source server (or distributed over a source server farm) within one domain to resources in another domain requires numerous signaling steps among the source and target server farms. This process is difficult to orchestrate. Furthermore, today's data transfer architecture is an indirect, manual transfer process that is time consuming and costly. In particular, to transfer data from one domain to another, the source server farm initially backs up the data to be transferred, and thereafter manually copies the backed-up data into a shared database. Thereafter, the target server farm restores the copied data from the shared data center. Additionally, administrative permissions for human access to the tenant data must be created in both the source and target domains. Unfortunately, such a system scales poorly, lacks security and is unsuitable for large hosting environments.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure are directed toward a communication framework that automatically orchestrates signaling between domains lacking a trust relationship in order to move tenant data from one domain to another. The communication framework may sit in the same or different "regional management layers," which are control centers for different systems (e.g., within different geographic environments such as the United States and Europe), different work engines (e.g., an Office365® SharePoint® work engine and another SharePoint® server farm with an Azure® identity), etc. A management layer may include any level of computing abstraction, from a control module (program) to a managing server farm. Moreover, a source management layer and a target management layers do not need to be at the same level of abstraction to communicate (e.g., a source program can listen to messages from a target server farm).

In aspects, a system executing a general management layer is provided. The system includes at least one processing unit and at least one memory storing computer executable instructions that, when executed by the at least one processing unit, cause the system to perform a method. The method includes receiving an indication to transfer tenant data from a source domain to a target domain, where the source domain is managed by a source management layer and the target domain is managed by a target management layer. In response to receiving the request, the method includes establishing a secure communication session, generating a key pair, and providing at least one key of the key pair to each of the source management layer and the target management layer. Additionally, the method includes detecting completion of each of a plurality of steps involved in transferring the tenant data from the source domain to the target domain and, in response to detecting completion of the plurality of steps, terminating the secure communication session.

In further aspect, a method for transferring a tenant from a source domain to a target domain is provided. The method includes receiving, by a source management layer, an indication to transfer a tenant off the source domain, where the indication includes an identification of a target domain managed by a target management layer, and where the source management layer lacks a trust relationship with the target management layer. The method further includes receiving access to a secure communication channel established between the source management layer and the target management layer and receiving a key pair. Additionally, the method includes encrypting a first portion of a first message using a first key of the key pair, where the first message is associated with a step of a plurality of steps associated with transferring the tenant to the target domain, and sending the first encrypted message to the target management layer. The method also includes receiving a second encrypted message from the target management layer and decrypting the second encrypted message using a second key of the key pair, the second message indicating that the target management layer has completed a first subsequent step associated with transferring the tenant to the target domain. In response to receiving the second encrypted message, the method includes initiating a second subsequent step associated with transferring the tenant to the target domain.

In still further aspects, a system executing a source management layer is provided. The system includes at least one processing unit and at least one memory storing computer executable instructions that, when executed by the at least one processing unit, cause the system to perform a method. The method includes receiving, by the source management layer, an indication to transfer a tenant off a source domain, where the indication includes an identification of a target domain managed by a target management layer, and where the source management layer lacks a trust relationship with the target management layer. The method further includes receiving access to a secure communication channel established between the source management layer and the target management layer. Additionally, the method includes receiving a key pair; encrypting a first portion of a first message using a first key of the key pair, where the first message is associated with a step of a plurality of steps associated with transferring the tenant to the target domain; and sending the first encrypted message to the target management layer. The method also includes receiving a second encrypted message from the target management layer and decrypting the second encrypted message using a second key of the key pair, the second message indicating that the target management layer has completed a first subsequent step associated with transferring the tenant to the target domain. In response to decrypting the second encrypted message, the method includes initiating a second subsequent step associated with transferring the tenant to the target domain.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
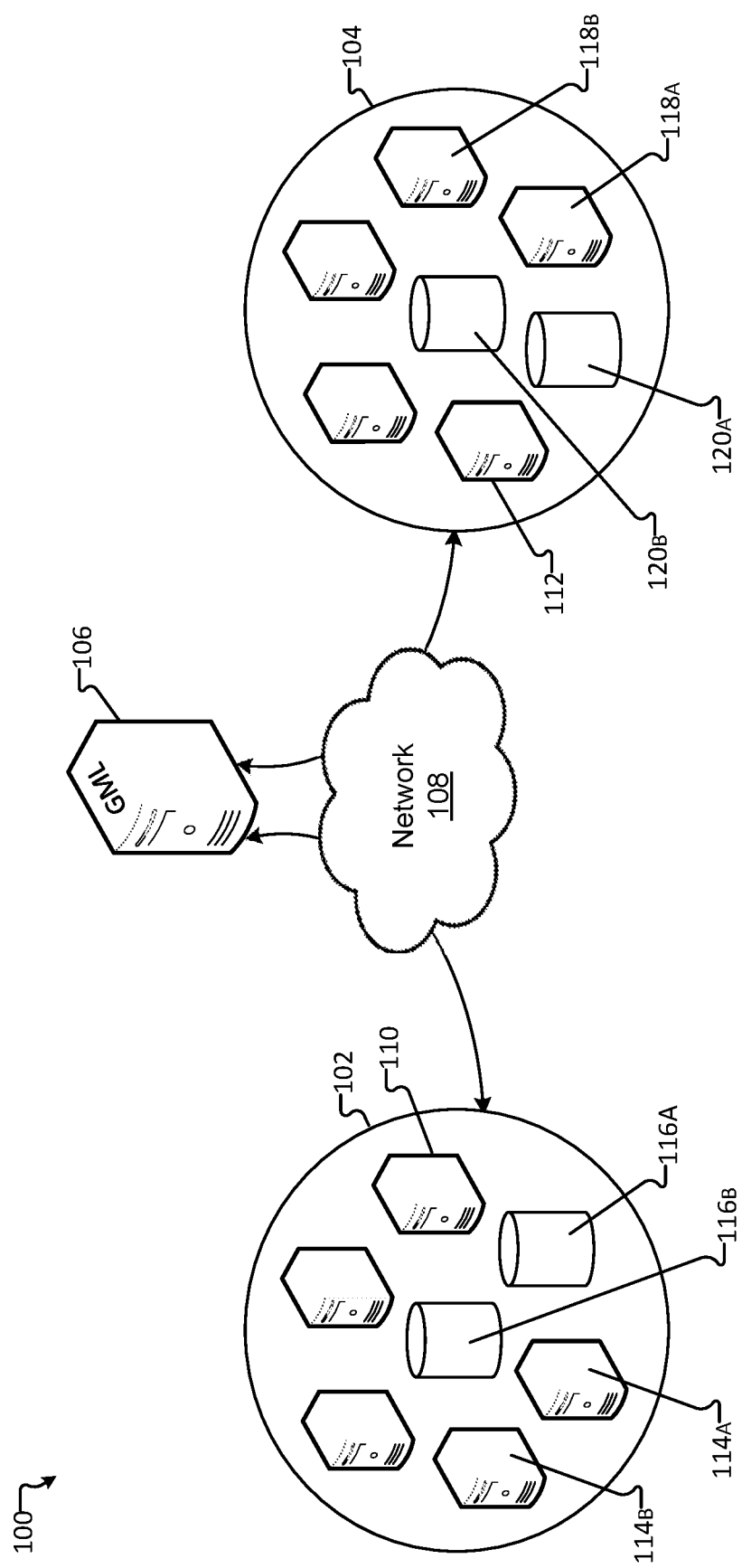
FIG. 1 illustrates an example system managed by a general management layer for transferring tenant data from a source domain to a target domain.

Various aspects will be described in detail with reference to the drawings, wherein like reference numerals represent like parts and assemblies throughout the several views. Reference to various aspects does not limit the scope of the claims attached hereto. Additionally, any examples set forth in this specification are not intended to be limiting and merely set forth some of the many possible aspects for the appended claims.

As described herein, transferring data across domains today is expensive, inefficient, and time consuming. Furthermore, for data security reasons, direct communication between hosted tenants is prohibited. Accordingly, aspects provided herein describe an efficient transfer of tenant data across different domains hosted by different management layers using a secure communication channel. In particular, disclosed is a communication framework for handling signaling across different domains. The described approach does not require data replication, backup, and other onerous steps that are expensive, inefficient, and time consuming.

FIG. 1 illustrates an example system managed by a general management layer for transferring tenant data from a source domain to a target domain. The example system 100 illustrates an indirect arrangement for transferring data from a source tenant to a target tenant. The system 100 includes a first domain 102 managed by a first regional management layer (e.g., source management layer 110), a second domain 104 managed by a second regional management layer (e.g., target management layer 112), and a general management layer 106, wherein the general management layer 106 communicates in a one-way trust relationship with each regional management layer (e.g., the source management layer 110 and target management layer 112) via network 108. In aspects, a "domain" refers to a hosting environment that includes hardware and software resources (e.g., volatile and non-volatile memory, data storage locations, one or more processors, communication buses, etc.) provided by at least one server and managed by a management layer. As detailed above, a management layer may include any level of computing abstraction, from a control module (program) to a managing server farm. Moreover, a source management layer and a target management layers do not need to be at the same level of abstraction to communicate (e.g., a source program can listen to messages from a target server farm).

In further aspects, a domain may exist in a distributed environment, such as a cloud computing environment, where resources are distributed between and among a plurality of servers (e.g., a server farm). As illustrated, the first domain 102 comprises a server farm with a plurality of servers (e.g., servers 114A and 114B) and a plurality of hardware storage locations (e.g., storage 116A and 116B). The second domain 104 also comprises a server farm with a plurality of servers (e.g., servers 118A and 118B) and a plurality of hardware storage locations (e.g., storage 120A and 120B). Furthermore, the first domain 102 hosts one or more tenants (not shown) and the second domain 104 also hosts one or more tenants (not shown). In aspects, tenants hosted on first domain 102 are different than tenants hosted on second domain 104. Additionally, tenants hosted on first domain 102 may utilize one or more resources (e.g., servers 114A, 114B and/or storage 116A, 116B) managed by source management layer 110; and tenants hosted on second domain 104 may utilize one or more resources (e.g., servers 118A, 118B and/or storage 120A, 120B) managed by target management layer 112.

In this example, the general management layer 106 communicates directly with each regional management layer and/or with each tenant within each domain so as to provide system upgrades and security monitoring. In particular, the general management layer 106 has a one-way trust mode of communication with each regional management layer and each tenant associated therewith. However, direct communications are not allowed among the tenants, regardless of whether the tenants are located within the same domain or different domains, nor are direct communications allowed among the regional management layers. All communication therefore must be performed through the general management layer 106. Accordingly, if data is to be moved from a resource hosting a source tenant to a resource hosting a target tenant (whether located in the same domain or another domain), such data transfer is done by indirect communication between the source and target management layers, and under the direction of the general management layer. That is, as each transfer step is accomplished to move either the source data or the target data, a communication is sent to the general management layer, which then passes a confirmation to the other tenant before the next step is initiated. However, as the general management layer 106 acts as a mediator for all communications regarding the data transfer, such data transfer requires significant overhead and processing by the general management layer and is inefficient, poorly scalable, and time consuming.

Figure 2:
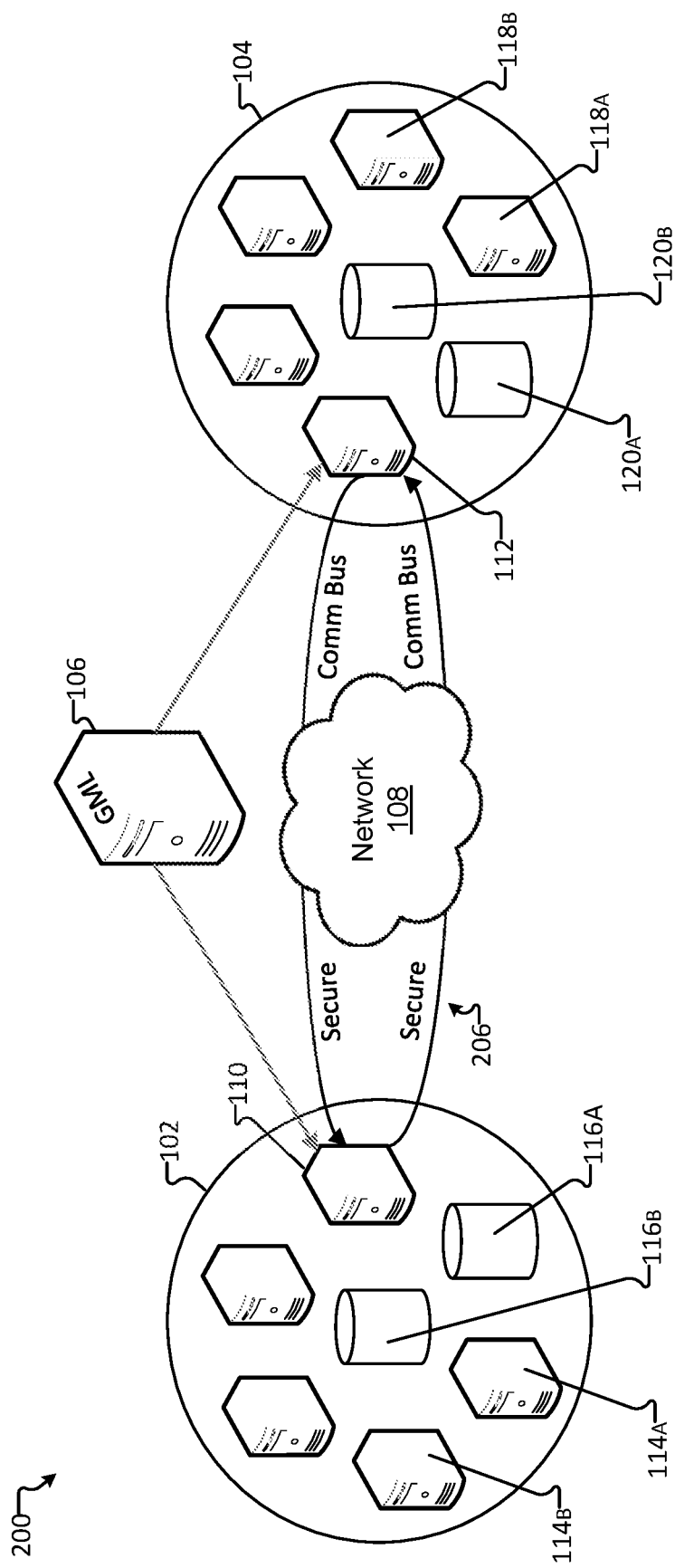
FIG. 2 illustrates an example system for transferring tenant data from a source domain to a target domain using a secure communication bus directly between a source management layer and a target management layer.

FIG. 2 illustrates an example system for transferring tenant data from a source domain to a target domain using a secure communication bus directly between the source management layer and the target management layer.

The system 200 illustrates an improvement to the system shown in FIG. 1. In particular, the system 200 illustrates a first domain 102 (hereinafter referred to as the source domain) managed by a first regional management layer (hereinafter referred to as the source management layer 110), a second domain 104 (hereinafter referred to as the target domain) managed by a second regional management layer (hereinafter referred to as the target management layer 112) and a general management layer 106. In aspects, a source tenant (not shown) may be hosted on the first domain 102 (e.g., source domain) and a target tenant (not shown) may be hosed on the second domain 104 (e.g., target domain). That is, source data of the source tenant may be hosted by the source domain (e.g., stored on and managed by resources maintained by source management layer 110). In order to better service all tenants and balance resources within the overall hosting environment, the source data may need to be moved to one or more resources managed by the target management layer 112. In further aspects, the target management layer 112 may currently manage data services for one or more target tenants, which may include target data that is stored on and managed by resources maintained by the target management layer 112. In some cases, in order to facilitate the source data transfer, the target management layer 112 may need to relocate target data for one or more target tenants within the target domain 104, thereby freeing resources for the source data of the source tenant. In other cases, whether or not target data must be relocated on the target domain, the target management layer 112 may be required to provision resources on the target domain prior to receiving the source data of the source tenant. In aspects, provisioning resources may involve provisioning Active Directory farms, content farms, search farms, SQL farms, etc., for the source tenant. Such a data transfer requires coordination between the source management layer 110 and the target management layer 112.

As should be appreciated, relocating data within a hosting environment may involve numerous steps to free storage on one resource before data can be transferred from another resource. Thus, each transfer step is dependent on completion of a previous step, which requires intricate coordination and cooperation between transferring parties. However, in the case of transferring data from one domain to another, the source management layer 110 and the target management layer 112 do not have a trust relationship, and neither do the source tenant and the target tenant. Accordingly, source data must not be accessible to the target tenant (or any other tenant), and target data must not be accessible to the source tenant (or any other tenant). Even so, according to aspects described herein, although the source management layer 110 and the target management layer 112 do not have a trust relationship, source data may be transferred directly from the source domain 102 to the target domain 104 based on secure communications between the source management layer 110 and the target management layer 112. In this way, rather than waiting to receive confirmation from the general management layer 106 or continuously pinging a system log for updates, each management layer is directly notified in real time by the other management layer as each data transfer step is completed. Accordingly, as soon as a management layer receives a completion notification, the management layer is able to immediately initiate a next step, reducing delays and streamlining orchestration of the data transfer process.

As will be described in further detail herein, the general management layer 106 may, in response to receiving a data transfer request, create a temporary communication session for direct communication between the source management layer 110 and the target management layer 112 over the secure communication bus 206. For example, the secure communication bus 206 may be a secure sockets layer (SSL), an Azure® service bus, etc., established between the source management layer 110 and the target management layer 112. The secure communication bus 206 allows source data to be transferred from the source domain 102 to the target domain 104 based on orchestrated and secure communications between the source management layer 110 and the target management layer 112. In particular, the secure communication bus 206 is reserved solely for communicating encrypted data packets between the source management layer 110 and the target management layer 112. For each data transfer from the source domain 102 to the target domain 104 over the secure communication bus 206, a session is created and a public/private key pair is generated by the general management layer 106. The public/private key pair for the session is provided only to the source management layer 110 and the target management layer 112. Further, a unique public/private key pair is generated for each session, and a new session is created for each tenant move. In this case, each message is encrypted using a public key and decrypted using a private key. Accordingly, the data transferred over the secure communication bus 206 is also secure. Additionally or alternatively, the general management layer 106 may also enforce rules for tenant moves. For example, in certain cases, a particular tenant may be prohibited from being moved to or from a particular domain. In this case, the general management layer 106 may prevent such a tenant move (e.g., by not creating a secure session, not creating a public/private key pair, responding with an error to a data transfer request, etc.).

As will be described in further detail with reference to FIG. 3, the data payload of a message may be encrypted, while the header of the message may be provided in cleartext. In aspects, the header may merely provide information such as a To/From field (e.g., identifying which management layer is sending and receiving the message) and a time stamp. Such a configuration may allow a monitor to be configured (e.g., an automated system monitor) that continuously observes the secure channel to determine whether steps are progressing as anticipated between the management layers without gaining access to the message payload. For example, the monitor may evaluate the header of the message to assess whether one or more data packets are missing, whether data transfer steps are being performed out of order, or even whether data transfer steps have been omitted. Although the monitor may have the ability to evaluate the status of the data transfer, the third party cannot access the encrypted data payload of the message because the monitor does not have the private key used to decrypt the data payload. Accordingly, the contents of the data payload remain encrypted and secure. In some examples, the secure communication session is temporary, and terminates upon conclusion of the data transfer.

Figure 3:
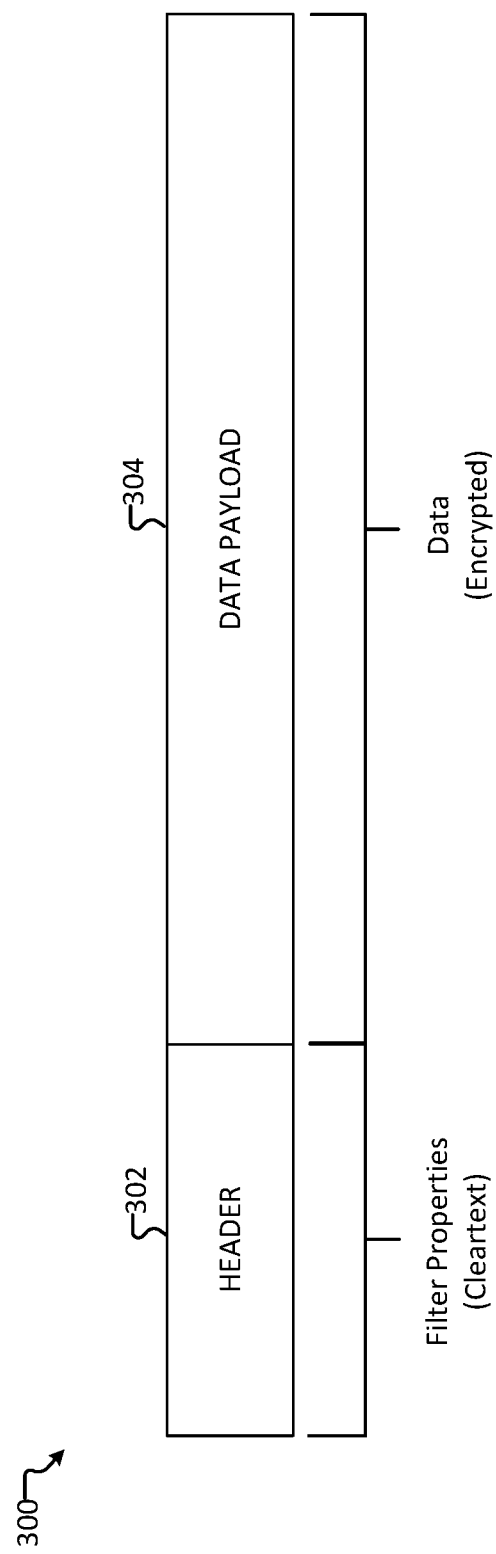
FIG. 3 illustrates an example data packet that may be communicated over a secure communication channel.

FIG. 3 illustrates an example data packet 300 that may be communicated over the secure communication channel.

As described herein, although lacking a trust relationship, aspects provide the ability to directly transfer messages between a source management layer (e.g., source management layer 110) and a target management layer (e.g., target management layer 112) over a secure communication channel (e.g., secure communication bus 206). Aspects further describe a structure of the message. In particular, an example message 300 illustrated herein contains a header 302 and a data payload 304. In some aspects, the header 302 contains destination and source information identifying the source tenant, source and target management layers (e.g., filter properties), and subject information identifying the type of data contained in the data payload 304. Furthermore, the data payload 304 may contain the actual source data that is being transferred from the source domain to the target domain. In an example, information stored in the header 302 is written in cleartext, whereas information stored in the data payload 304 is encrypted with the public key generated by the general management layer (e.g., general management layer 106 of FIG. 2). As described herein, information contained in the header 302 is written in cleartext so that the status of the data transfer may be monitored without accessing the contents of the data payload 304. That is, with proper credentials, the "activity" on the secure communication bus may be monitored to ensure that the transfer process is progressing as expected, which eliminates the need to evaluate network logs or other sources of information to monitor the progress of data transfer steps. Furthermore, even if an unauthorized party obtains access to the secure communication bus, the information provided in the data payload 304 is encrypted to avoid access by the unauthorized party.

Figure 4:
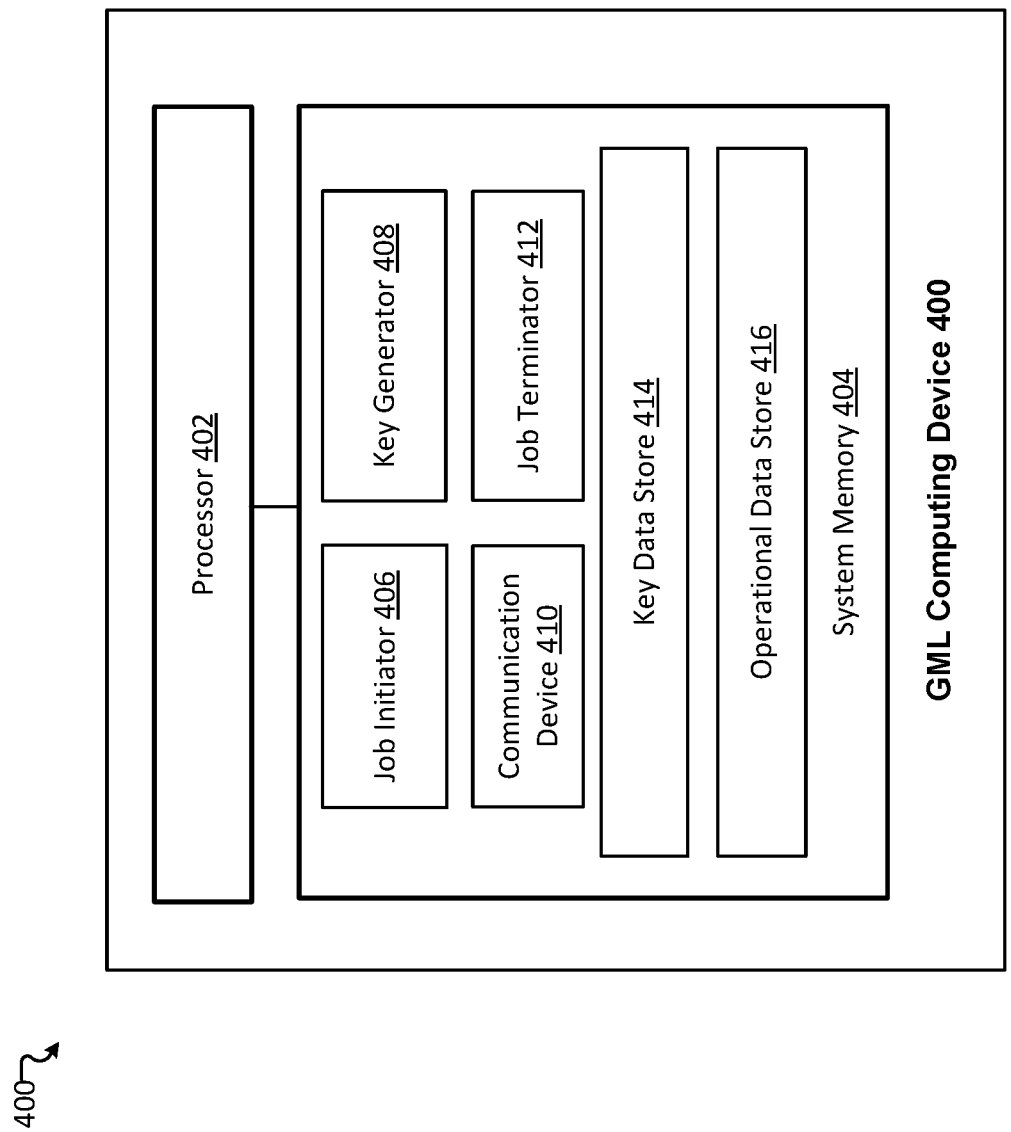
FIG. 4 illustrates a schematic block diagram of a computing device serving as a general management layer, according to an example embodiment.

FIG. 4 illustrates a schematic block diagram of a computing device serving as a general management layer (GML), according to an example embodiment.

In the example embodiment shown, the computing device 400 includes at least one processor 402 operatively coupled to at least one system memory 404. In aspects, the computing device 400 may be a server, represent a server farm, or represent a general management layer distributed within a cloud hosting environment, etc. In this example, the system memory 404 includes applications that when executed by processor 402 provide one or more of a job initiator 406, a key generator 408, a communication device 410, and a job terminator 412. The system memory 404 further includes a key data store 414 and an operational data store 416.

As described herein, the computing device 400 serving as a general management layer is responsible for generating a temporary and secure communication session between a source management layer and a target management layer. The computing device 400 that serves as the general management layer also generates encryption and decryption keys as used by the regional management layers to secure transmitted data packets over the secure communication bus. Once the data transfer is complete, the computing device 400 serving as the general management layer may terminate the secure communication session.

In an example, the job initiator 406 may receive a data transfer request from a source management layer or system administrator. In one example, the data transfer request identifies the source tenant as well as the target domain and the management layer, wherein the source domain stores source data for the source tenant, which source data is to be transferred to the target domain. In response to receiving a data transfer request, the job initiator 406 may establish a temporary communication session such that the source management layer and the target management layer may directly send one or more data packets over a secure communication bus. The job initiator 406 may set a time period during which communication of data packets may occur. The job initiator 406 may also set filter properties (e.g., identify the source management layer and the target management layer) and credentials that identify personnel who have authority to access sensitive information about the source tenant.

According to an example, the key generator 408 may generate a unique key-value pair that may be used by the source management layer and the target management layer to encrypt and decrypt the data packets shared over the secure communication bus. According to one example encryption scheme, a public key may be used to encrypt the data payload of the data packet while a private key may be used to decrypt the encrypted data payload. In such an example, the key generator 408 may generate both the public key used to encrypt data and the private key used to decrypt the encrypted data. The communication device 410 may provide the public/private key pair to both the source management layer and the target management layer such that each message between the two management layers may be encrypted with the public key and decrypted with the private key. For example, the source management layer may encrypt source data with the public key as a data payload within a message transfer to the target management layer. The target management layer may then decrypt the encrypted source data using the private key and store the source data at a provisioned location on the target domain. Yet in other aspects, the key generator 408 may generate other types of encryption (e.g., other than public/private keys) for securing the messages between the source management layer and the target management layer.

The job terminator 412 may terminate the temporary communication session. In one example, the job terminator 412 terminates the temporary communication session after all the source data has been transferred from the source domain to the target domain. In another example, the job terminator 412 terminates the temporary communication session based on the expiration of the communication time set by the job initiator 206. Termination of the temporary communication session may refer to closing the secure communication channel such that data packets can no longer be shared between the source management layer and the target management layer. Additionally, termination may result in the expiration of the encryption keys such that the keys may not be used to encrypt or decrypt data. Alternatively or additionally, the job terminator 412 may terminate the temporary communication session in response to receiving a request to terminate the session from one of the source management layer and the target management layer.

The key data store 414 may rest in memory and store each public-private key pair generated by the key generator 408. In one example, the key data store 414 further stores each public-private key pair in association with the source and target management layer information and session information. In one example, the keys are deleted from the key data store 414 in response to termination of the communication session.

The operational data store 416 may store the data relating to execution of a general management layer, such as, for example, operational program code. The operational data store 416 may store additional information to operate the general management layer on computing device 400 as required.

Figure 5:
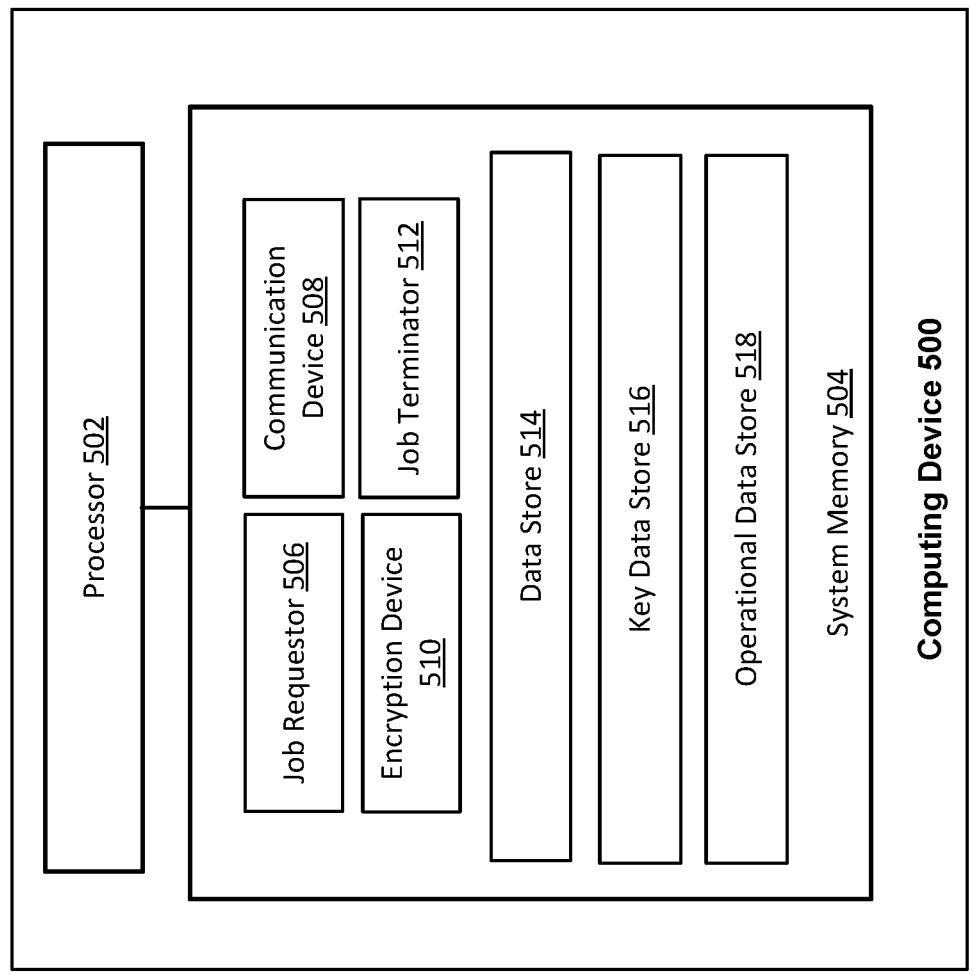
FIG. 5 illustrates a schematic block diagram of a computing device serving as a regional management layer, according to an example embodiment.

FIG. 5 illustrates a schematic block diagram of a computing device 500 serving as a regional management layer, according to an example embodiment.

In the example shown, the computing device 500 may refer to the source management layer 110 or the target management layer 112, both illustrated in FIG. 2. In other examples, as detailed above, a regional management layer may be a control module (program) executing on the depicted computing device 500. Furthermore, the computing device 500 may be a server, represent a server farm, represent a management layer distributed within a domain hosting environment, etc. In aspects, the computing device 500 may act as a source management layer or a target management layer at different times depending on whether a tenant is moving onto or off the domain managed by the regional management layer. In one example, the computing device 500 may include a processor 502 operatively coupled to system memory 504. In this example, the system memory 504 includes applications that when executed by processor 502 provide one or more of a job requestor 504, a communication device 508, an encryption device 510, a job terminator 512, a data store 514, a key data store 516, and an operational data store 518.

In one example, the job requestor 506 creates a transfer request for the general management layer when a tenant transfer is to be initiated. As described herein, aspects of this disclosure describe transferring tenant data directly from a source domain to a target domain via secure communications between a source management layer and a target management layer. In this case, upon receiving and verifying the transfer request, a general management layer may create a secure communication bus (e.g., secure communication bus 206) such that the source management layer may securely transfer tenant data to the target management layer. In aspects, "verifying" the data transfer request may involve ensuring that rules associated with the tenant are not violated by moving the tenant to the target domain. The job requestor 506 therefore may create a request including but is not limited to source tenant information, source management layer information, target management layer information, data transfer timeline information, credentialing information for the source domain, credentialing information for the target domain, etc.

In an example, the communication device 508 may perform multiple communication tasks. In some examples, the communication device 508 sends and receives messages to and from the general management layer over a network, and in other examples the communication device 508 sends and receives messages to and from another regional management layer (either a source management layer or a target management layer) over the secure communication channel. In one example, the communication device 508 sends the request to initiate data transfer, wherein the request is created by the job requestor 506, to the general management layer. The communication device 508 may also receive one or more messages from the general management layer such as, for example, providing credentials and session information indicating that the secure communication bus is ready for data transfer, providing location information for associated data stores (e.g., within the source or target domains), providing URL information for one or more tenants, and providing public and private keys for encrypting and decrypting messages and message payloads (e.g., transferred data). In some examples, and as will be described in detail herein, the communication device 508 may send, to the general management layer, a message indicating completion of the data transfer. In some embodiments, the general management layer may, in response to receiving such a message, terminate the secure session.

In one example, the encryption device 510 is used to encrypt data using the public key provided by the general management layer. As described herein, according to example aspects, the encryption device 510 only encrypts the data payload portion of a message, while maintaining the header portion of the message in cleartext. In some examples, the encryption device 510 may also decrypt encrypted data received using a matching private key, which may also be provided by the general management layer.

The job terminator 512 may, according to an example, send a message to the general management layer indicating when the data transfer is complete. In an example, the job terminator 512 may monitor the data stored in the data store 514 to determine when the data transfer is complete. Alternatively or additionally, the job terminator 512 may monitor the data transfer process to determine whether all steps have been completed. Alternatively or additionally, the job terminator 512 may receive a message indicating that all files have been received from the target tenant. In some examples, in response to the termination message from the job terminator 512, the general management layer may terminate the secure session so that no other messages may be exchanged between the source management layer and the target management layer.

In an example, the data store 514 may cache one or more data files for transfer to the target management layer or upon receipt from the source management layer. In some cases, the one or more data files may be cached in an encrypted state. Alternatively, the one or more data files may be buffered for transfer or upon receipt in a buffer that is external to system memory 504. In one example, the data files stored in the data store 514 may be automatically deleted upon a successful transfer to the target management layer. Alternatively, the data files stored in the data store 514 may be deleted upon a deletion request.

In one example, the key data store 516 may store the public and private keys generated by the general management layer for a particular secure session. In one aspect, the public and private keys may be automatically deleted after termination of the secure session. Alternatively, the public and private keys may be deleted upon a deletion request.

The operational data store 518 may store the data relating to execution of process steps by the computing device (whether acting as a source management layer or a target management layer), such as, for example, operational program code. The operational data store 518 may store additional information to operate the computing device as required.

Figure 6:
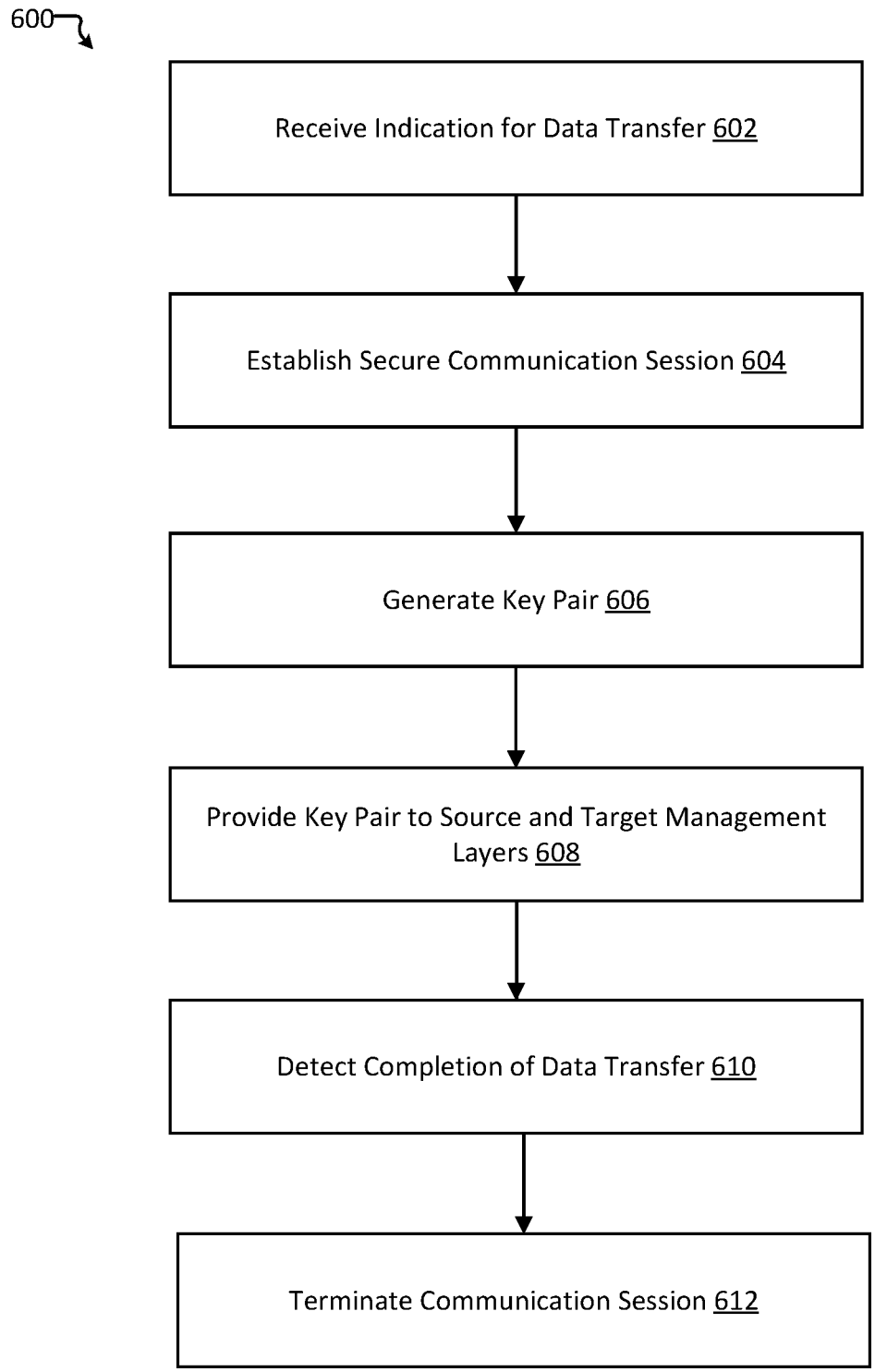
FIG. 6 illustrates a method for establishing a secure session for transferring tenant data from a source domain to a target domain

FIG. 6 illustrates a method 600 for establishing a secure session for transferring tenant data from a source domain to a target domain.

In one aspect, the method 600 is performed by one or more computing devices (or a program executing on a computing device) serving as a general management layer (e.g., the general management layer illustrated in FIGS. 1, 2, and 4). In operation 602, the general management layer (e.g., job initiator 104 of FIG. 4) receives an indication to transfer a tenant between two domains. In some cases, the indication may be in response to monitoring resources across a hosting environment overseen by the general management layer. For example, it may be determined that a tenant (e.g., source tenant) on one domain (e.g., source domain) is growing faster than other tenants on the source domain and requires a greater portion of the storage resources, or that a tenant requires more processing resources than other tenants on the source domain, and the like. Additionally, the indication may identify a target domain that is suitable (e.g., has sufficient hardware and/or software resources) for hosting the source tenant. Alternatively, the general management layer may receive a data transfer request from a source management layer, or other administrative entity, when it is determined that a tenant should be transferred off a source domain. Alternatively or additionally, the general management layer may receive a data transfer request from a target management layer. In one example, the data transfer request may identify information regarding the source domain, the target domain and the source tenant, wherein the source tenant is associated with source data, which is to be transferred from the source domain to the target domain. The request may include additional information such as, for example, a data transfer initiation date, deadline date and/or a data transfer timeline over which the data transfer is to occur.

In operation 604, the general management layer (e.g., the job initiator 406 of FIG. 4) establishes a secure communication session. For example, in response to receiving a data transfer request in operation 602, the general management layer may establish a temporary communication session such that the source management layer and the target management layer may directly send one or more messages over a secure communication bus. The general management layer may set a time period during which communication of messages may occur. The general manager server may also set filter properties (e.g., identifying the source management layer and the target management layer) and credentials that identify personnel who have authority to access sensitive information about the source tenant. The general management layer may obtain such information from the request.

In operation 606, the general management layer (e.g., the key generator 408 of FIG. 4) generates a key pair. The general manager server may generate a unique key-value pair that may be used by the source management layer and the target management layer to encrypt and decrypt the messages shared over the secure communication bus. According to one example encryption scheme, a public key may be used to encrypt the data payload of the message while a private key may be used to decrypt the encrypted data payload. In such an example, the general management layer may generate both the public key used to encrypt data and the private key used to decrypt the encrypted data.

In operation 608, the general management layer (e.g., the communication device 410 of FIG. 4) provides the keys generated in operation 606 to the two regional management layers involved in the tenant transfer (e.g., the source management layer and the target management layer). In one example, the general management layer may provide the public key for encrypting messages transferred between the source management layer and the target management layer. Still further, the general manager server may provide the matching private key for decrypting the encrypted messages received by either the source management layer or the target management layer via the secure communication bus. For instance, encrypted messages may include a cleartext header portion and an encrypted message payload. The encrypted message payload may include encrypted data (e.g., source tenant data), information regarding a data transfer step that has been completed by one of the management layers, and the like. Such messages are encrypted such that unauthorized parties cannot have access to tenant data, information regarding tenant identity, information regarding the types of data transfer steps taken or the progress of the data transfer steps performed, etc.

In operation 610, the general management layer (e.g., via communication device 410) may detect that a plurality of data transfer steps involved in transferring the source tenant data from the source domain to the target domain have been completed by the source and/or target management layers. In some cases, the general manager may receive an indication from a monitor that each of the plurality of steps has been completed. In other instances, the general manager may detect that each of the plurality of steps has been completed by receiving a message from the source and/or target management layer. In still further instances, the general manager may monitor the progress and completion of each of the plurality of steps.

In operation 612, the general management layer (e.g., via job terminator 412) may terminate the temporary secure communication session created in operation 604. In one example, the general management layer terminates the temporary secure communication session after all tenant data has been transferred from the source domain to the target domain. In another example, the general management layer terminates the temporary secure communication session based on the expiration of a data transfer deadline provided in the transfer request received in operation 602. Termination of the secure communication session may refer to closing the secure communication channel such that messages can no longer be shared between the source management layer and the target management layer. Additionally, termination may result in the expiration of the encryption keys such that the keys may not be used to encrypt or decrypt data. Alternatively or additionally, the general management layer may terminate the temporary secure communication session in response to receiving a request to terminate the session from one of the source management layer and the target management layer.

As should be appreciated, operations 602-612 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
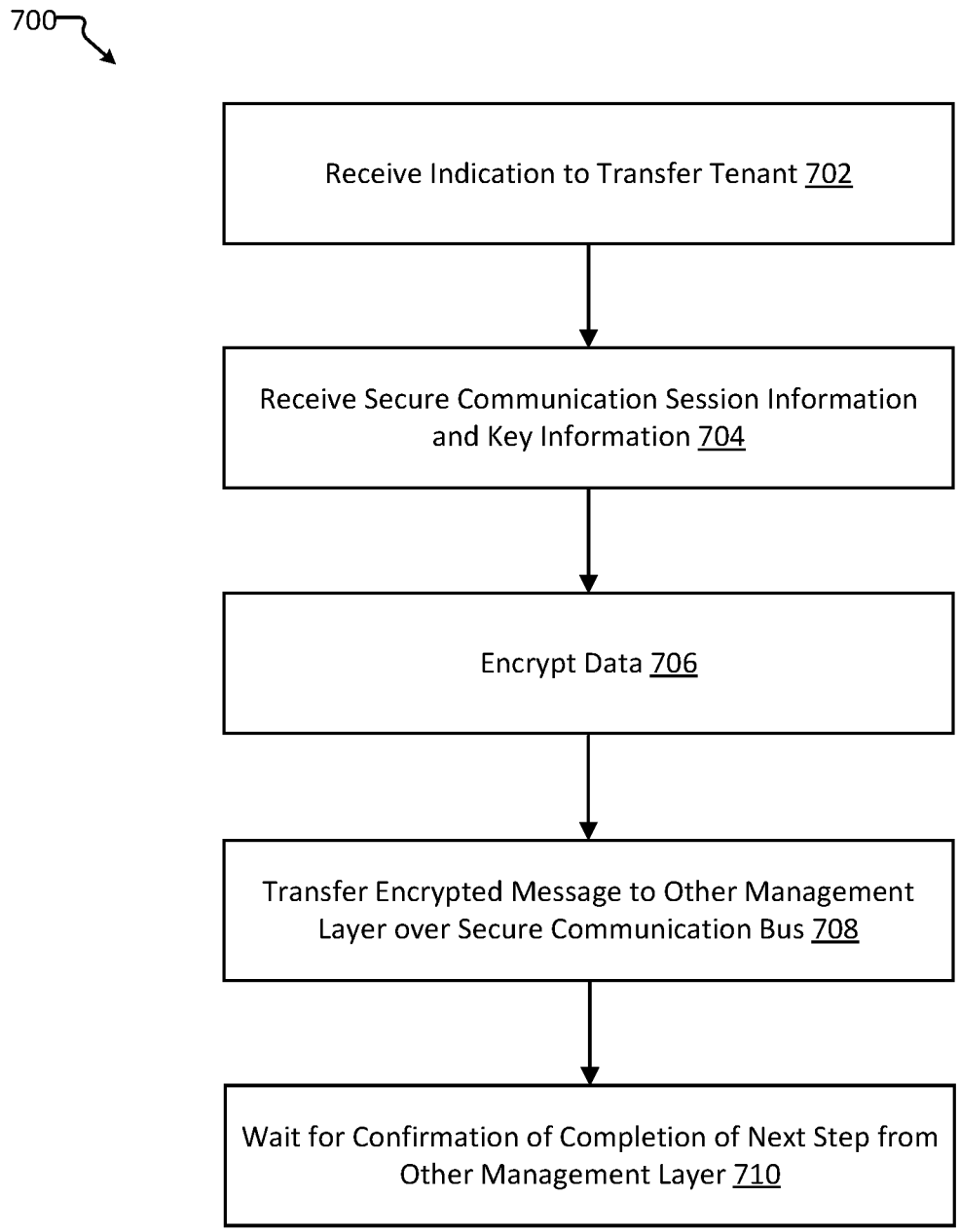
FIG. 7 illustrates a method for initiating a data transfer request and transferring tenant data from a source domain to a target domain

FIG. 7 illustrates a method 700 for initiating a data transfer request and transferring tenant data from a source domain to a target domain.

In one aspect, the method 700 is performed by one or more computing devices (or a program executing on a computing device) that serve as a regional management layer (e.g., source management layer 110 or target management layer 112 illustrated in FIGS. 2 and 5). In operation 702, the source management layer or the target management layer (e.g., job requestor 506 of FIG. 5) may send, to the general management layer, a data transfer request. In one example, the source management layer creates a request for the general management layer when a transfer of tenant data is to be initiated. As described herein, aspects of this disclosure describe transferring data directly from a source domain to a target domain, whereby a general management layer creates a secure communication session such that the source management layer may transfer source tenant data to the target management layer over a secure communication bus. The source management layer may therefore create a request that includes source tenant information, target domain information, data transfer timeline information, etc.

In operation 704, the source and target management layers (e.g., via communication device 508 of FIG. 5) may receive communication channel and key information from the general management layer. In particular, the source and target management layers may receive one or more messages from the general management layer such as session information, e.g., indicating channel information, a time when the secure communication bus will be available for data transfer, etc., and public and private keys for encrypting and decrypting messages.

In operation 706, the source and/or target management layer (e.g., via encryption device 510 of FIG. 5) may encrypt a message to be transferred to the other management layer. In particular, the source management layer may encrypt a message including a source data payload using the public key provided by the general management layer in operation 704. Alternatively, the target management layer may encrypt a message indicating that a preliminary step to provision resources for the source tenant data has been completed. In some examples, the source and/or target management layer might only encrypt the data payload portion of the message, while maintaining the header portion of the message in cleartext. In this way, a monitor may be able to view activity (or chatter) on the secure communication bus without being able to view the message payload. In some examples, the source and/or target management layer may also decrypt an encrypted message received from the other regional management layer using a matching private key, which may also be provided to both regional management layers by the general management layer.

In operation 708, the source and/or target management layer (e.g., via communication device 508 of FIG. 5) may transfer an encrypted message to the other management layer over the secure communication bus. In an example, the source and target management layers may exchange one or more encrypted messages over the secure communication bus during the secure session established by the general management layer. In one example, over the tenant transfer process, the source management layer may transfer all of the tenant data associated with the source tenant to the target management layer for subsequent hosting on the target domain.

In operation 710, the source and/or the target management layer (e.g., via job terminator 512 of FIG. 5) may send a completion signal to the general management layer. In one example, the source management layer may send a message to the general management layer indicating when the data transfer has been completed. In an example, the source management layer may monitor the data cached in a data store of the source management layer to determine when the data transfer has been completed. Alternatively or additionally, the target general management layer may send a message to the general management layer indicating that all source data files have been received and stored in the target domain. In some examples, the general management layer uses the messages received from the source and/or target management layer to terminate the secure session so that no other messages may be exchanged between the source management layer and the target management layer. In other examples, a monitor may indicate to the general management layer that all steps in the tenant transfer job have been completed. In still other cases, the general management layer itself may monitor the progress and completion of the tenant transfer job and may terminate the secure communication bus as soon as the job is complete.

As should be appreciated, operations 702-710 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, as described herein.

Figure 8:
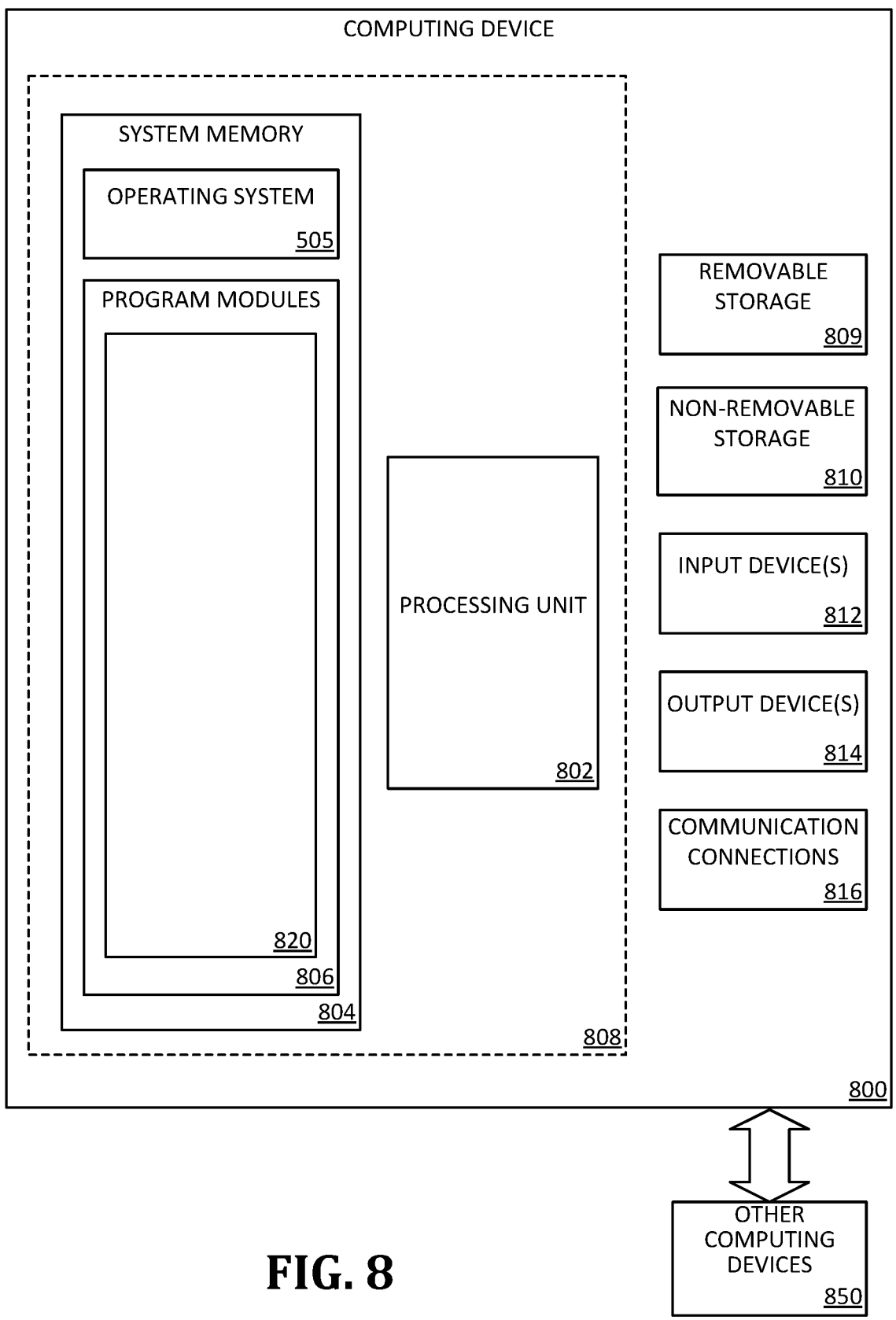
FIG. 8 is a block diagram illustrating physical components (e.g., hardware) of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for implementing aspects of the present disclosure on a computing device (e.g., general management layer 106, source management layer 110, or target management layer 112), that can be executed to implement the methods disclosed herein. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 (e.g., job initiator 406, key generator 508, communication device 410, job terminator 412) suitable for operating the systems and methods described herein.

The operating system 805, for example, may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810. As stated above, a number of program modules and data files may be stored in the system memory 804. While executing on the processing unit 802, the program modules 806 may perform processes including, but not limited to, the aspects, as described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
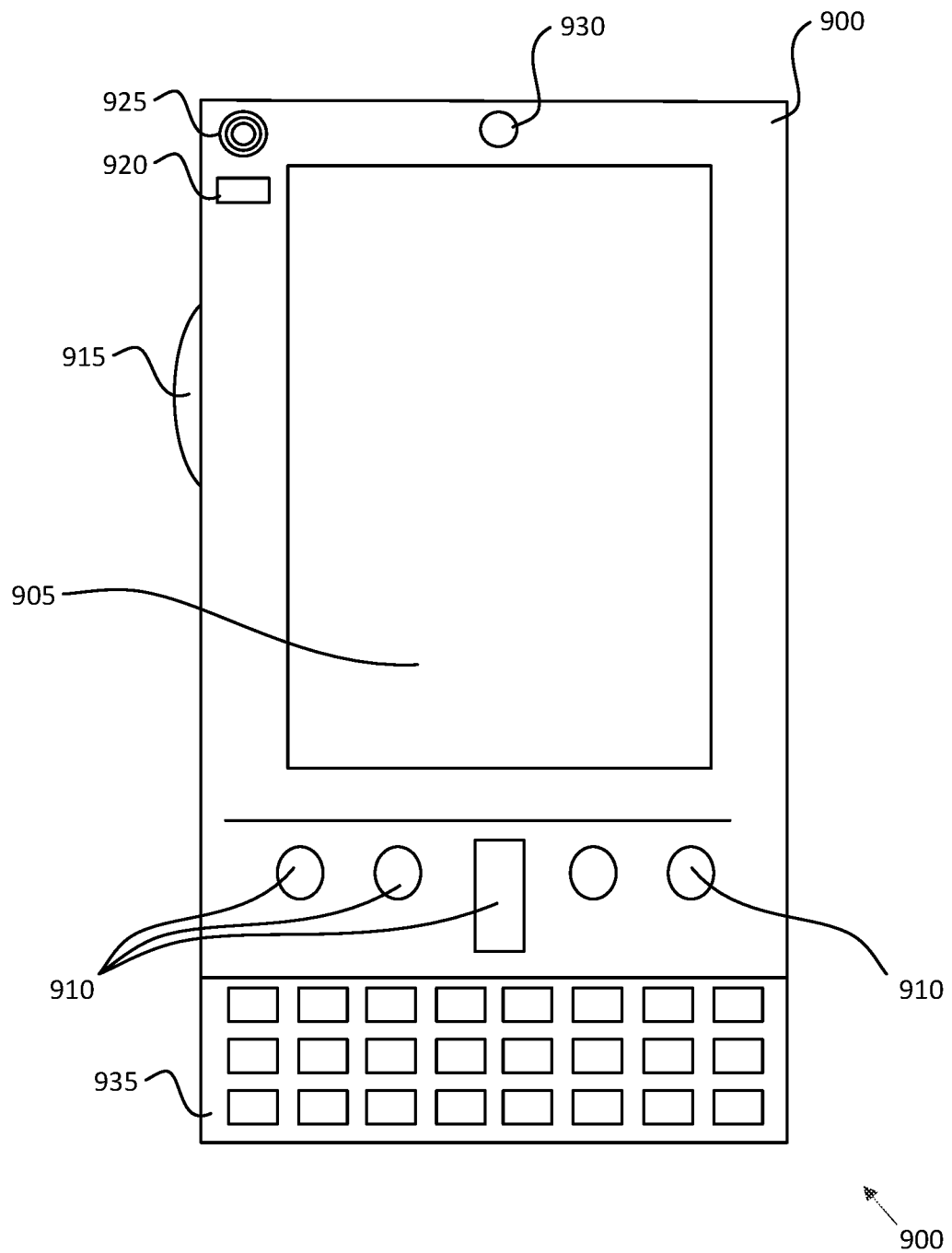
FIG. 9A and FIG. 9B illustrate a mobile computing device, for example, a mobile telephone, a smart phone, wearable computer (such as a smart watch), a tablet computer, a laptop computer, and the like, with which aspects of the disclosure may be practiced.
Figure 9B:
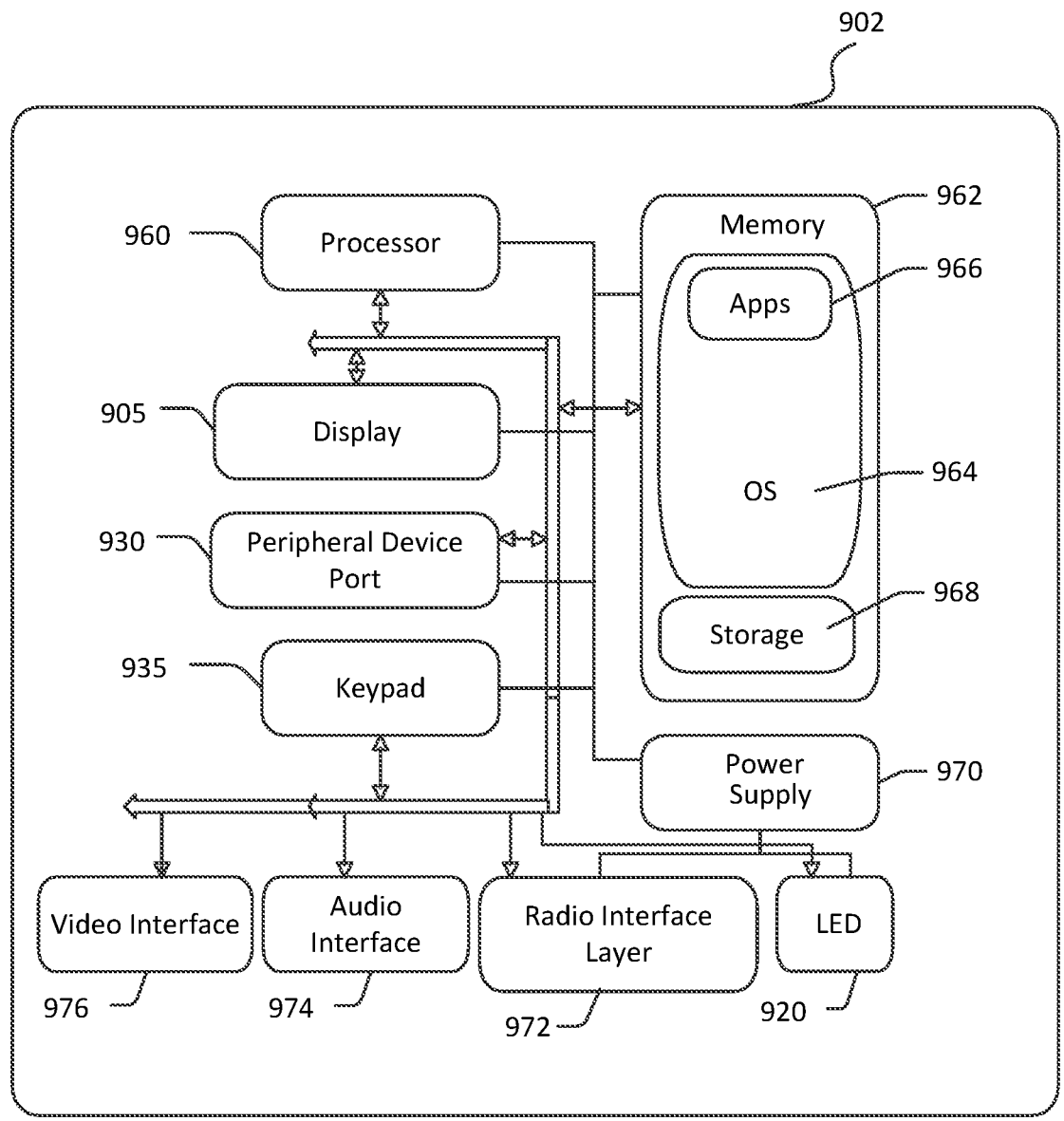

FIG. 9A and FIG. 9B illustrate a mobile computing device 900, for example, a mobile telephone, a smart phone, wearable computer (such as a smart watch), a tablet computer, a laptop computer, and the like, with which aspects of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one aspect, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

The system 902 has a power supply 970, which may be implemented as one or more batteries. The power supply 970 may further include an external power source, such as an AC adapter or a powered docking cradle that supplements or recharges the batteries. The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 925 (e.g., audio transducer 925 illustrated in FIG. 9A). In the illustrated aspect, the visual indicator 920 is a light emitting diode (LED) and the audio transducer 925 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and is not intended to limit the disclosure to a particular sequence of steps or a particular combination of hardware or software components.

Figure 10:
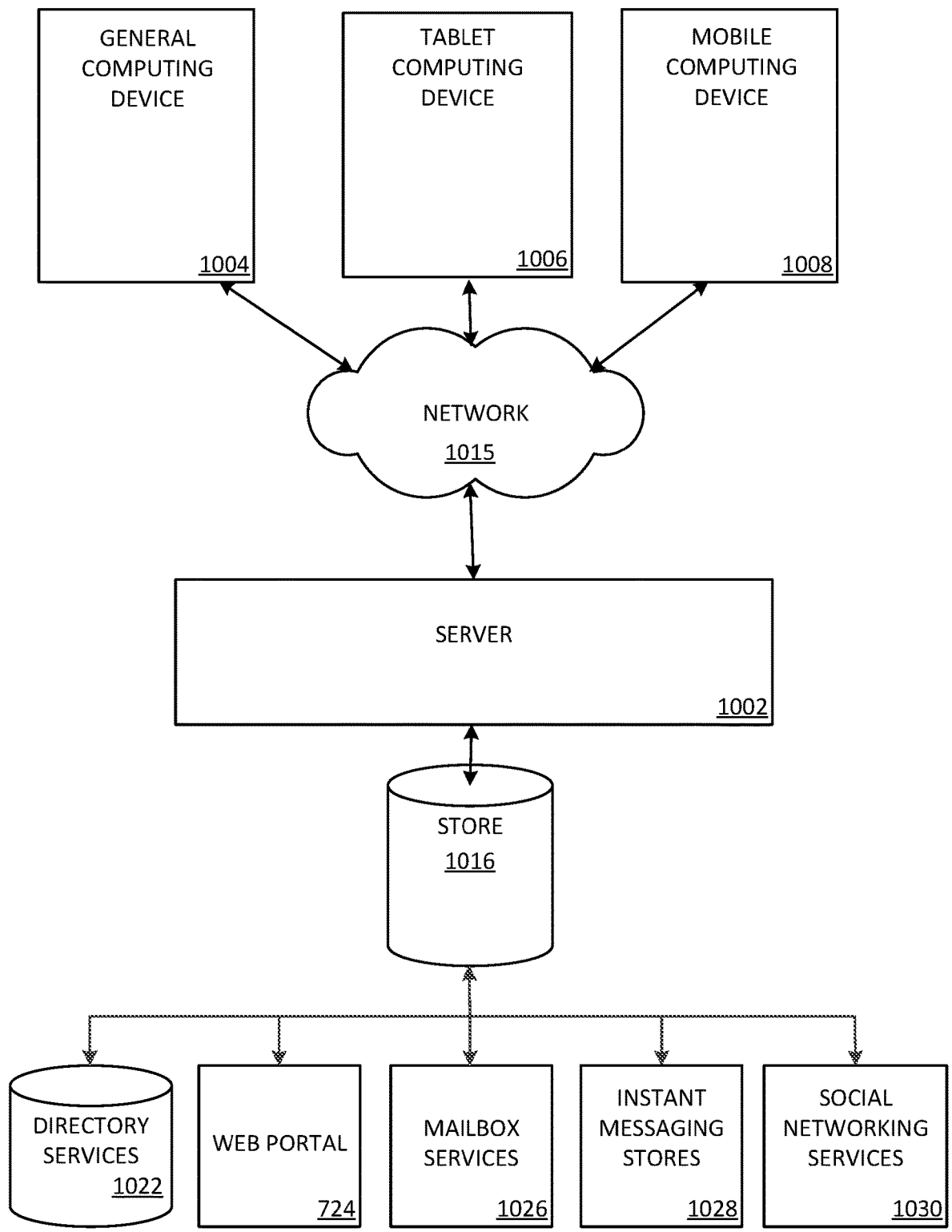
FIG. 10 illustrates one aspect of the architecture of a system for processing data received at a computing system from a remote source, such as a general computing device (e.g., personal computer), tablet computing device, or mobile computing device, as described above.

FIG. 10 illustrates one aspect of the architecture of a system for processing data received at a computing system from a remote source, such as a general computing device 1004 (e.g., personal computer), tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking service 1030. The server device 1002 may provide data to and from a client computing device such as a general computing device 1004, a tablet computing device 1006 and/or a mobile computing device 1008 (e.g., a smart phone) through a network 1015. By way of example, the computer system described above may be embodied in a general computing device 1004 (e.g., personal computer), a tablet computing device 1006 and/or a mobile computing device 1008 (e.g., a smart phone). Any of these aspects of the computing devices may obtain content from the store 1016, in addition to receiving graphical data useable to either be pre-processed at a graphic-originating system or post-processed at a receiving computing system.

As should be appreciated, FIG. 10 is described for purposes of illustrating the present methods and systems and is not intended to limit the disclosure to a particular sequence of steps or a particular combination of hardware or software components.

Figure 11:
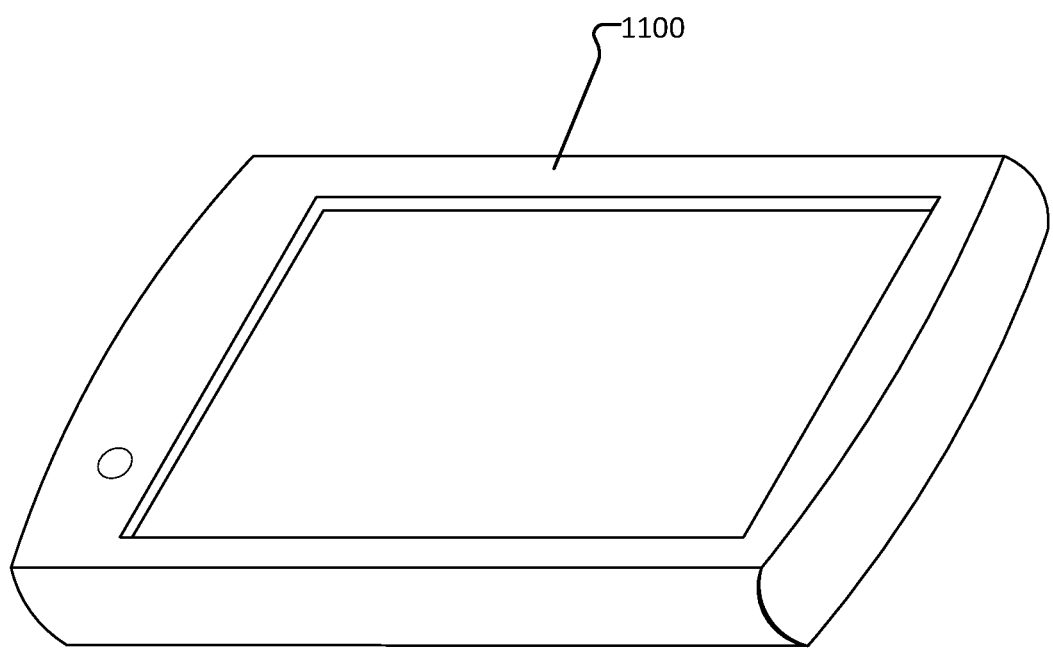
FIG. 11 illustrates an exemplary tablet computing device that may execute one or more aspects disclosed herein.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 11 is described for purposes of illustrating the present methods and systems and is not intended to limit the disclosure to a particular sequence of steps or a particular combination of hardware or software components.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this disclosure are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system executing a general management layer comprising:
   at least one processing unit; and
   at least one memory storing computer executable instructions that, when executed by the at least one processing unit, cause the system to perform a method, the method comprising:
      receiving an indication to transfer first tenant data of a first tenant from a source domain to a target domain, wherein the first tenant data comprises a plurality of first data portions, wherein the source domain is managed by a source management layer associated with the first tenant and the target domain is managed by a target management layer associated with at least a second tenant, wherein the source domain hosts the first tenant data comprising the plurality of first data portions and the target domain hosts second tenant data comprising a plurality of second data portions, and wherein the source management layer and the target management layer are not in a trusted relationship;
      in response to receiving the indication, establishing a secure communication session;
      generating a key pair;
      providing at least one key of the key pair to each of the source management layer and the target management layer;
      monitoring a first message associated with the target management layer, wherein the first message comprises a first encrypted payload comprising a second data portion of the second tenant transferred from a first resource to a second resource on the target domain in a first transfer step, and wherein a first unencrypted message header indicates completion of the first transfer step;
      in response to the indication of completion of the first transfer step, relaying a second message between the source management layer and the target management layer, wherein the second message comprises a second encrypted payload comprising a first data portion of the first tenant transferred from a third resource on the source domain to the first resource on the target domain in a second transfer step, wherein a second unencrypted message header indicates completion of the second transfer step, and wherein at least one of the first encrypted payload comprising the second data portion or the second encrypted payload comprising the first data portion is encrypted by at least one key of the key pair;
      automatically orchestrating each of a plurality of transfer steps involved in transferring the first tenant data of the first tenant from the third resource on the source domain to the first resource on the target domain based on evaluating a plurality of unencrypted message headers; and
      in response to detecting completion of the plurality of transfer steps, terminating the secure communication session.

2. The system of claim 1, wherein the indication to transfer the first tenant data identifies one or more of the first tenant, the source management layer, the target management layer, the source domain, and the target domain.

3. The system of claim 1, wherein the secure communication session further comprises:
   establishing a secure communication bus directly between the source management layer and the target management layer.

4. The system of claim 1,
   wherein data stored within the first unencrypted message header is provided in cleartext.

5. The system of claim 1, wherein monitoring the plurality of unencrypted message headers enables the system executing the general management layer to detect that at least one of the plurality of transfer steps has occurred.

6. The system of claim 1, wherein the source management layer and the target management layer are located in different server farms.

7. The system of claim 3, further comprising:
   setting a time period during which communication of messages over the secure communication bus may occur.

8. The system of claim 1, wherein generating the key pair further comprises:
   generating a public key for encrypting data; and
   generating a private key for decrypting data.

9. A method for transferring a tenant from a source domain to a target domain, the method comprising:
   receiving, by a source management layer, an indication to transfer first tenant data of a first tenant off the source domain, wherein the first tenant data comprises a plurality of first data portions, wherein the indication includes an identification of a target domain managed by a target management layer associated with at least a second tenant, wherein the source domain hosts the first tenant data comprising the plurality of first data portions and the target domain hosts second tenant data comprising a plurality of second data portions, and wherein the source management layer lacks a trust relationship with the target management layer;
   receiving access to a secure communication channel established between the source management layer and the target management layer;
   receiving a key pair;
   receiving a first message from the target management layer, wherein the first message comprises a first encrypted payload comprising a second data portion of the second tenant transferred from a first resource to a second resource on the target domain in a first transfer step of a plurality of transfer steps, and wherein a first unencrypted message header indicates completion of the first transfer step;
   encrypting a first data portion of the plurality of first data portions in a second encrypted payload of a second message using a first key of the key pair, wherein the second message transfers the first data portion of the first tenant from a third resource on the source domain to the first resource on the target domain in a second transfer step, and wherein the second message further comprises a second unencrypted message header that indicates completion of the second transfer step of the plurality of transfer steps;
   receiving a plurality of subsequent messages from the target management layer, wherein the plurality of subsequent messages comprise subsequent encrypted payloads, wherein each subsequent encrypted payload comprises a subsequent data portion of the second tenant that is transferred off of the first resource on the target domain, and wherein each subsequent unencrypted message header indicates completion of a subsequent transfer step; and completing an orchestrated transfer of the plurality of first data portions of the first tenant off the third resource of the source domain and onto the first resource of the target domain.

10. The method of claim 9, wherein the first unencrypted message header is in cleartext.

11. The method of claim 10, wherein the first unencrypted message header includes an identification of a sender and a receiver of the first message.

12. The method of claim 9, wherein access to the secure communication channel is limited to the source management layer and the target management layer.

13. The method of claim 9, wherein each subsequent transfer step of the plurality of transfer steps cannot be initiated until a prior transfer step is completed.

14. The method of claim 9, wherein encrypting the first data portion of the second message prevents first tenant data from being exposed.

15. The method of claim 9, wherein the indication to transfer the first tenant off of the third resource of the source domain occurs in response to an evaluation of resources on the source domain.

16. A system executing a source management layer comprising:

at least one processing unit; and at least one memory storing computer executable instructions that, when executed by the at least one processing unit, cause the system to perform a method, the method comprising:

receiving, by the source management layer, an indication to transfer first tenant data of a first tenant off a source domain, wherein the first tenant data comprises a plurality of first data portions, wherein the indication includes an identification of a target domain managed by a target management layer associated with at least a second tenant, wherein the source domain hosts the first tenant data comprising the plurality of first data portions and the target domain hosts second tenant data comprising a plurality of second data portions, and wherein the source management layer lacks a trust relationship with the target management layer;

receiving access to a secure communication channel established between the source management layer and the target management layer;

receiving a key pair;

receiving a first message from the target management layer, wherein the first message comprises a first encrypted payload comprising a second data portion of the second tenant transferred from a first resource to a second resource on the target domain in a first transfer step of a plurality of transfer steps, and wherein a first unencrypted message header indicates completion of the first transfer step;

encrypting a first data portion of the plurality of first data portions in a second encrypted payload of a second message using a first key of the key pair, wherein the second message transfers the first data portion of the first tenant from a third resource on the source domain to the first resource on the target domain in a second transfer step, and wherein the second message further comprises a second unencrypted message header that indicates completion of the second transfer step of the plurality of transfer steps;

receiving a plurality of subsequent messages from the target management layer, wherein the plurality of subsequent messages comprise subsequent encrypted payloads, wherein each subsequent encrypted payload comprises a subsequent data portion of the second tenant that is transferred off of the first resource on the target domain, and wherein each subsequent unencrypted message header indicates completion of a subsequent transfer step; and completing an orchestrated transfer of the plurality of first data portions of the first tenant off the third resource of the source domain and onto the first resource of the target domain.

17. The system of claim 16, wherein the first unencrypted message header is in cleartext.

18. The system of claim 17, wherein the first unencrypted message header includes an identification of a sender and a receiver of the first message.

19. The system of claim 16, wherein access to the secure communication channel is limited to the source management layer and the target management layer.

20. The system of claim 16, wherein each subsequent transfer step of the plurality of transfer steps cannot be initiated until a prior transfer step is completed.

* * * * *